UNITED STATES PATENT OFFICE.

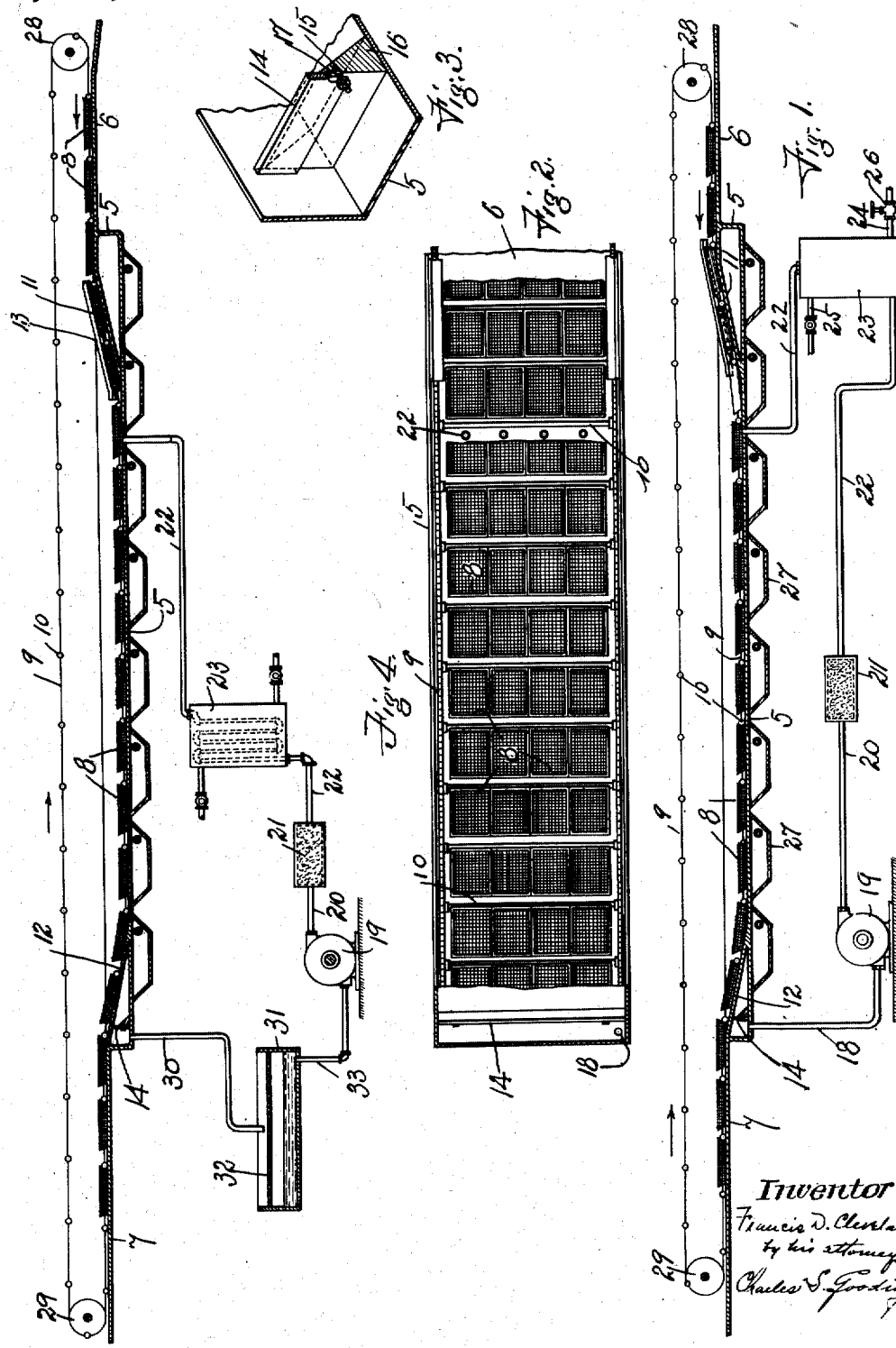

FRANCIS D. CLEVELAND, OF CAMBRIDGE, MASSACHUSETTS.

APPARATUS FOR COOKING ARTICLES OF FOOD.

1,234,131.     Specification of Letters Patent.     Patented July 24, 1917.

Application filed August 1, 1916. Serial No. 112,606.

*To all whom it may concern:*

Be it known that I, FRANCIS D. CLEVELAND, a citizen of the United States, residing at Cambridge, in the county of Middlesex and State of Massachusetts, have invented new and useful Improvements in Apparatus for Cooking Articles of Food, of which the following is a specification.

This invention relates to apparatus for cooking articles of food by frying the same in oil and is particularly adapted to the frying of fish. It is well known that when it is desired to cook an article such as fish or any other article of food by frying that it is important that the required temperature of the oil should be maintained when the article of food, such as fish, is inserted in the hot oil in order to obtain the best results in the cooked product. It will be evident that the natural tendency, especially where a large amount of comparatively cold fish is to be fried or cooked, is to substantially lower the temperature of the hot oil when said mass of cold fish is inserted therein. The desirable condition is to prevent the lowering of the temperature of the oil at the point where the fish are inserted therein and to maintain said oil at a substantially equal temperature throughout the receptacle through which the fish pass as they are being cooked by the boiling oil. The result in the cooked product is entirely different if such conditions can be maintained in an apparatus of the character set forth from what it would be if the fish entered the oil and reduced the temperature of the oil to a substantial extent.

This invention has for its object to provide an apparatus which will at the instant the fish first enter the oil keep the temperature of the oil from being substantially reduced. In frying fish in oil a considerable amount of foreign matter is mixed with the oil during the frying operation, such, for instance, as scales and other undesirable matter, so that the oil becomes impure and the quality of the fried fish will be materially injured if these impurities are not removed from the oil at frequent intervals so that the fish may be cooked in oil and substantially pure oil at all times.

It is further the object of this invention to provide an apparatus which will at the instant when the fish first enter the oil prevent the temperature of the oil at that point from being substantially reduced and which will keep the temperature of the oil at the desired height throughout the entire receptacle, and further it is a very important object of this invention to provide an apparatus which will secure a continual flow of oil through the receptacle and then cause said oil to pass out of the receptacle and subsequently be filtered and heated before it reënters said receptacle.

To secure these results this invention contemplates primarily a tank or any suitable receptacle for containing the oil and means which will cause a continual flow of oil through the tank or receptacle and then cause said oil to pass out of said receptacle and subsequently be filtered and heated before it reënters said receptacle. The fish enter the receptacle adjacent to the point of reëntry of the hot oil, then pass through said receptacle and out of the same adjacent to the point where the oil is drawn out of the tank.

To obtain these results I employ preferably pipe connections leading out of one end of the tank and into the other end of the tank and in said pipe connections is introduced a pump for forcing the oil through the tank, around outside and back into it again, a filter for filtering the oil so as to remove any impurities therein and a heater for heating the oil before it reënters the tank; also preferably I insert in the pipe connections a strainer for removing from the oil any excess amount of impurities or foreign matter which may have gotten into the oil as it passes through the tank, oftentimes by reason of a basket containing the fish which is being carried through the oil being wholly or partially upset.

The apparatus embodying my invention contemplates the use of one series of connections with a heater embodied therein, or it may have a series of said connections and a filter and heater, as hereinafter fully described and set forth in the claims.

The invention consists in an apparatus of the character described in the following specification and particularly as set forth in the claims.

Referring to the drawings:

Figure 1 is a sectional elevation of my improved apparatus for cooking articles of food.

Fig. 2 is a sectional plan view of the tank portion of the same.

Fig. 3 is a perspective detail illustrating the gate.

Fig. 4 is a sectional elevation similar to Fig. 1 but having introduced in the pipe connections a strainer.

Like numerals refer to like parts throughout the several views of the drawings.

In the drawings, Figs. 1 2 and 3, 5 is a tank adapted to contain oil and having tables 6 and 7 at opposite ends thereof. Baskets 8 for containing fish are moved by a conveyer chain 9 with rods 10 thereon along the table 6 in the direction of the arrow $a$ down the incline 11 into the tank 5 and along the bottom of said tank until they arrive at the incline 12 up which they are pushed until they arrive on the table 7, from which they are removed by the operator.

A guide 13 is provided to cause the baskets to enter the oil and a gate 14 is located beneath the incline 12 at the end of the tank out of which the fish pass and this gate is fastened by bolts 15 to a support 16 fast to the bottom of the tank. The bolts 15 extend through slots 17 in the gate 14, whereby it is possible to adjust the gate 14 to different heights relatively to the bottom of the tank so that the depth of the oil in said tank may be varied.

Back of the gate 14 and beneath the incline 12 at that end of the tank out of which the fish pass is an outlet pipe 18 which leads to a pump 19. The pump 19 is connected by a pipe 20 to a filter 21 and the filter 21 is connected by a pipe 22 to a heater 23 and passes therefrom into the bottom of the tank 5 adjacent to the point at which the fish enter the oil in said tank.

The heater 23 is supplied with steam heat by means of an inlet pipe 24 and an outlet pipe 25, so that the oil contained in the pipe 22 as it passes through the heater 23 is heated to any desired temperature, a valve 26 being supplied to regulate the amount of steam supplied to said heater 23.

Beneath the tank are located a number of steam heated chambers 27 into which the steam is admitted to keep the temperature of the oil at a certain degree after the initial frying of the fish which occurs when they first enter the oil adjacent to the point where the oil reënters the tank through the pipe 22.

The conveyer chains 9 are connected together by rods 10 and these chains are driven by sprocket wheels 28 and 29 so that a plurality of series of baskets 8 of fish, as illustrated in Fig. 2, may be carried through the oil in the tank at the same time, thus increasing its output.

The general operation of the apparatus illustrated in Figs. 1, 2 and 3 is as follows: Oil is introduced into the tank until it arrives at the desired depth, which depth is determined by the height of the gate 14 from the bottom of the tank. The oil is heated by means of the steam heat in the chambers 27 beneath said tank and the oil which reënters the tank adjacent to the point where the fish enter said tank is conducted through the pipe 18, pump 19, pipe 20, filter 21, pipe 22 and heater 23, so that there is a continual flow of oil in the direction of the arrow $a$ through the tank 5 and out of said tank adjacent to the end where the fish leave the tank and then, through the conducting means, back into the tank at the point adjacent to that where the fish enter said tank. The oil is drawn from the tank by the pump 19 and forced through the pipe 20, through the filter 21 and the pipe 22 into the tank at a point adjacent to that where the fish enter said tank.

The oil throughout the larger part of the tank is kept at a certain temperature except where said oil first enters the tank, namely, at that point where the fish enter the oil and at this point the oil as it enters the bottom of the tank is higher in temperature than the rest of the oil in the tank, so that as the oil passes up through the comparatively cold fish it will become cooled and when it finally arrives at the top of the tank will be at substantially the same temperature as the oil in the remainder of the tank.

In Fig. 4 a modified form of my invention is used in which a strainer is introduced in the connections which convey the oil out of the tank and back into the tank, the object of this strainer being to take care of any excess amount of waste material which may pass through the tank and through the pipe connections leading out of the tank and back into the same.

Referring to Fig. 4 all parts of the apparatus are substantially the same as the form of my invention illustrated in Fig. 1, except that the outlet pipe 30 is connected to a strainer 31 in which there is a screen 32 which prevents large pieces of foreign material, such as fish, which may have been tipped out of the baskets 8 in the tank 5, remaining in said tank, while the oil still containing impurities, such as scales of fish and the like, passes out through a pipe 33 to the pump 19 and thence through the pipe 20 to the filter 21 and from the filter 21 through the pipe 22 and heater 23 into the tank 5.

The general operation of the form of my invention illustrated in Fig. 4 is substantially the same as that illustrated in Figs. 1 to 3.

Having thus described my invention, what

I claim and desire by Letters Patent to secure is:

1. An apparatus for frying fish and the like having, in combination, a receptacle for oil, means for conducting oil out of and into said receptacle, means for heating said oil before it is conducted into said receptacle and other means for heating said oil after it has been introduced into said receptacle.

2. An apparatus for frying fish and the like having, in combination, a receptacle for oil, means for heating the oil while it is in said receptacle, means for conducting oil out of and into said receptacle and other means for heating said oil before it is conducted into said receptacle.

3. An apparatus for frying fish and the like having, in combination, a receptacle for oil, means for conducting oil out of and into said receptacle at points a substantial distance apart, means for heating said oil before it has left said receptacle and other means for heating said oil before it enters said receptacle.

4. An apparatus for frying fish and the like having, in combination, a receptacle for oil, means for conducting oil out of and into said receptacle, means for filtering said oil after it has left said receptacle and means for heating said oil after it has been filtered and before it enters said receptacle.

5. An apparatus for frying fish and the like having, in combination, a receptacle for oil, means for drawing said oil out of said receptacle and forcing it to reënter said receptacle, means for heating said oil while it is passing through said receptacle, and other means for heating said oil before it reënters said receptacle.

6. An apparatus for frying fish and the like having, in combination, a receptacle for oil, means for drawing said oil out of said receptacle and forcing it to reënter said receptacle, means for heating said oil before it is forced into said receptacle and means for filtering said oil before it enters said receptacle.

7. An apparatus for frying fish and the like having, in combination, a receptacle for oil, means for feeding fish or the like into said oil, means for conducting oil out of said receptacle and into said receptacle, said means arranged to conduct said oil into said receptacle adjacent to the part of said receptacle into which said fish or the like are first introduced and means for heating said oil before it is conducted into said receptacle.

8. An apparatus for frying fish and the like having, in combination, a receptacle for oil, means for heating the oil while in said receptacle, means for feeding fish or the like into said oil, means for conducting oil out of said receptacle and into said receptacle, said means arranged to conduct said oil into said receptacle adjacent to the part of said receptacle into which said fish or the like are first introduced and means for heating said oil before it is conducted into said receptacle.

9. An apparatus for frying fish and the like having, in combination, a receptacle for oil, means for feeding fish or the like into and out of said receptacle, means for conducting oil out of said receptacle and into said receptacle adjacent to that portion thereof into which said fish or the like are first introduced and means for heating said oil before it is conducted into said receptacle.

10. An apparatus for frying fish and the like having, in combination, a receptacle for oil, means for feeding fish or the like into and out of said receptacle, means for drawing said oil from said receptacle adjacent to the portion of said receptacle out of which said fish pass, said drawing means arranged to cause said oil to enter said receptacle adjacent that portion into which said fish are first introduced and means for heating said oil after it has left said receptacle and before it reënters the same.

11. An apparatus for frying fish and the like having, in combination, a receptacle for oil, means for feeding fish or the like into and out of said receptacle, means for drawing said oil from said receptacle adjacent to the portion of said receptacle out of which said fish pass, said drawing means arranged to cause said oil to enter said receptacle adjacent that portion into which said fish are first introduced, means to filter said oil, and means for heating said oil after it has left said receptacle and before it reënters the same.

12. An apparatus for frying fish and the like having, in combination, a receptacle for oil, means to cause a continual flow of oil through said receptacle, out of said receptacle and back into said receptacle, means to heat said oil while it is passing through said receptacle, and other means to heat said oil after it has passed out of said receptacle and before it reënters the same.

13. An apparatus for frying fish and the like having, in combination, a receptacle for oil, means to cause a continual flow of oil through said receptacle, out of said receptacle and back into said receptacle, means to filter said oil and means to heat said oil after it has passed out of said receptacle and before it reënters the same.

14. An apparatus for frying fish and the like having, in combination, a receptacle for oil, means arranged to conduct fish or the like into said receptacle and out of said receptacle, a pipe connection leading out of said receptacle at one end thereof and into said receptacle at the other end thereof and a heater introduced into said pipe connection whereby oil passing through said pipe connection may be heated.

15. An apparatus for frying fish and the like having, in combination, a receptacle for oil, means arranged to conduct fish or the like into said receptacle and out of said receptacle, a pipe connection leading out of said receptacle at one end thereof and into said receptacle at the other end thereof, a filter and a heater introduced into said pipe connection whereby oil passing out of said receptacle and back into the same may be first filtered and then heated.

16. An apparatus for frying fish and the like having, in combination, a receptacle for oil, means arranged to conduct fish or the like into said receptacle and out of said receptacle, a pipe connection leading out of said receptacle, at one end thereof and into said receptacle at the other end thereof, a filter and a heater in said pipe connection and a pump introduced into said pipe connection whereby oil may be caused to flow through said receptacle and through said pipe connection, filter and heater.

17. An apparatus for frying fish and the like having, in combination, a receptacle for oil, means arranged to conduct fish or the like into said receptacle and out of said receptacle, a pipe connection leading out of said receptacle at one end thereof and into said receptacle at the other end thereof, a strainer, a filter and a heater in said pipe connection and a pump introduced into said pipe connection and arranged to force oil through said filter and heater and into said receptacle.

18. An apparatus for frying fish and the like having, in combination, a receptacle for oil, a series of chambers located beneath said receptacle and adjacent to the bottom thereof and means to introduce steam into said chambers whereby the oil while in said receptacle may be heated, means for conducting oil into and out of said receptacle at opposite ends thereof and means for heating said oil before it is conducted into said receptacle.

19. An apparatus for frying fish and the like having, in combination, a receptacle for oil, means for conducting oil out of and into said receptacle and means for filtering said oil before it reënters said receptacle.

20. An apparatus for frying fish and the like having, in combination, a receptacle for oil, means to cause a continual flow of oil through said receptacle, out of said receptacle and back into said receptacle and means to filter said oil after it has passed out of said receptacle and before it reënters the same.

21. An apparatus for frying fish and the like having, in combination, a receptacle for oil, means arranged to conduct fish or the like into said receptacle and out of said receptacle, a pipe connection leading out of said receptacle at one end thereof and into said receptacle at the other end thereof and a filter introduced into said pipe connection whereby oil passing out of said receptacle and back into the same may be first filtered before reëntering said receptacle.

22. An apparatus for frying fish and the like having, in combination, a receptacle for oil, means arranged to conduct fish or the like into said receptacle and out of said receptacle, a pipe connection leading out of said receptacle at one end thereof and into said receptacle at the other end thereof, a filter and a pump introduced in said pipe connection and arranged to force oil through said filter and into said receptacle.

In testimony whereof I have hereunto set my hand.

FRANCIS D. CLEVELAND.

It is hereby certified that Letters Patent No. 1,234,131, granted July 24, 1917, upon the application of Francis D. Cleveland, of Cambridge, Massachusetts, for an improvement in "Apparatus for Cooking Articles of Food," were erroneously issued to the inventor, said Cleveland, whereas said Letters Patent should have been issued to *William Underwood Company, of Boston, Massachusetts, a corporation of Massachusetts*, as shown by the records of assignments in this office; and that the said Letters Patent should be read with this correction therein, that the same may conform to the record of the case in the Patent Office.

Signed and sealed this 28th day of August, A. D., 1917.

[SEAL.]

R. F. WHITEHEAD,
*Acting Commissioner of Patents.*

Cl. 99—2